US012083847B1

(12) United States Patent
Blais

(10) Patent No.: US 12,083,847 B1
(45) Date of Patent: Sep. 10, 2024

(54) SYSTEM AND METHODS FOR DYNAMIC CONTROL OF SUSPENSION SYSTEMS OF VEHICLES

(71) Applicant: Integrated Engineering, LLC, Salt Lake City, UT (US)

(72) Inventor: Peter Anthony Blais, Park City, UT (US)

(73) Assignee: Integrated Engi ring, LLC, Salt Lake City, UT (US)

( * ) Notice: Subject to any disclaimer, the term of this patent is extended or adjusted under 35 U.S.C. 154(b) by 0 days.

(21) Appl. No.: 18/506,084

(22) Filed: Nov. 9, 2023

(51) Int. Cl.
    *B60G 17/0165* (2006.01)
(52) U.S. Cl.
    CPC .... *B60G 17/0165* (2013.01); *B60G 2600/182* (2013.01)
(58) Field of Classification Search
    CPC ................ B60G 17/0165; B60G 2600/182
    See application file for complete search history.

(56) References Cited

U.S. PATENT DOCUMENTS

| 10,486,485 B1* | 11/2019 | Levinson | B60G 17/0162 |
| 2015/0314663 A1* | 11/2015 | Rhode | B60G 17/0165 |
| | | | 701/37 |
| 2015/0314669 A1* | 11/2015 | Noda | F25B 41/20 |
| | | | 62/324.1 |
| 2021/0061279 A1* | 3/2021 | Nagata | G08G 1/0112 |

FOREIGN PATENT DOCUMENTS

CN      116653526 A   *   8/2023

* cited by examiner

*Primary Examiner* — Peter D Nolan
*Assistant Examiner* — Demetra R Smith-Stewart
(74) *Attorney, Agent, or Firm* — Scale LLP

(57) ABSTRACT

Disclosed are methods, systems, and non-transitory computer readable memory for dynamic control of suspension systems of vehicles. For instance, a method may include: obtaining a suspension control feature map; determining an initial location of a vehicle; determining a region of the suspension control feature map that corresponds to the initial location of the vehicle; determining a set of suspension control trigger conditions based on the region of the suspension control feature map; determining a current location of the vehicle; determining whether a first suspension control trigger condition of the set of suspension control trigger conditions is satisfied based on the current location; and in response to determining the first suspension control trigger condition is satisfied, instructing an adjustable suspension of the vehicle to transition from a first adjustable suspension setting to a second adjustable suspension setting.

19 Claims, 8 Drawing Sheets

US 12,083,847 B1

SYSTEM AND METHODS FOR DYNAMIC CONTROL OF SUSPENSION SYSTEMS OF VEHICLES

TECHNICAL FIELD

Various aspects of the present disclosure relate generally to systems and methods for dynamic control of suspension systems of vehicles and, more particularly, to systems and methods for dynamic control of suspension systems of vehicles using suspension control feature maps.

BACKGROUND

Generally, dynamic control of suspension systems of vehicles while driving is performed reactively, or in other words, after the vehicle has experienced some change in performance that could be corrected by adjusting a setting. However, user comfort or safety may already be impaired by reactive control of suspension systems. Thus, there is a need for automated systems that can dynamically control suspension systems proactively during travel.

The present disclosure is directed to overcoming one or more of these above-referenced challenges.

SUMMARY OF THE DISCLOSURE

According to certain aspects of the disclosure, systems, methods, and computer readable memory are disclosed for dynamic calibration of vehicular settings and, more particularly, to systems and methods for control of adjustable setting in a vehicle.

In some cases, a system for control of an adjustable suspension in a vehicle may include: a server configured to obtain suspension data for at least one user and generate a suspension control feature map for a first user based on at least the suspension data, wherein the at least one user includes the first user; and a control device configured to obtain the suspension control feature map from the server, wherein the control device is associated with the first user and configured to control an adjustable suspension of a vehicle associated with the first user. To control the adjustable suspension of a vehicle, the control device may be configured to: determine an initial location of the vehicle; determine a region of the suspension control feature map that corresponds to the initial location of the vehicle; determine a set of suspension control trigger conditions based on the region of the suspension control feature map; determine a current location of the vehicle; determine whether a first suspension control trigger condition of the set of suspension control trigger conditions is satisfied based on the current location; and in response to determining the first suspension control trigger condition is satisfied, instruct the adjustable suspension of the vehicle to transition from a first adjustable suspension setting to a second adjustable suspension setting.

In some cases, a computer-implemented method for control of an adjustable suspension in a vehicle may include: obtaining a suspension control feature map; determining an initial location of a vehicle; determining a region of the suspension control feature map that corresponds to the initial location of the vehicle; determining a set of suspension control trigger conditions based on the region of the suspension control feature map; determining a current location of the vehicle; determining whether a first suspension control trigger condition of the set of suspension control trigger conditions is satisfied based on the current location; and in response to determining the first suspension control trigger condition is satisfied, instructing an adjustable suspension of the vehicle to transition from a first adjustable suspension setting to a second adjustable suspension setting.

In some cases, a non-transitory computer-readable memory comprising instructions thereon that, when executed by at least one processor, cause the at least one processor to perform a method. The method may include: obtaining a suspension control feature map; determining an initial location of a vehicle; determining a region of the suspension control feature map that corresponds to the initial location of the vehicle; determining a set of suspension control trigger conditions based on the region of the suspension control feature map; determining a current location of the vehicle; determining whether a first suspension control trigger condition of the set of suspension control trigger conditions is satisfied based on the current location; and in response to determining the first suspension control trigger condition is satisfied, instructing an adjustable suspension of the vehicle to transition from a first adjustable suspension setting to a second adjustable suspension setting.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

DETAILED DESCRIPTION

Various aspects of the present disclosure relate generally to dynamic control of suspension systems of vehicles. In some cases, the systems of the present disclosure may receive (1) aggregated crowd-sourced data regarding suspensions of vehicles for users, (2) user data regarding preferences, experiences, and/or suspension changes, and (3) terrain data. The systems of the present disclosure may generate suspension control feature maps based on these data sources, so that the suspension control feature maps may proactively control suspension systems of user vehicles.

In some cases, the suspension control feature maps may indicate regions where proactive suspension changes may be implemented, so that users experience safer, smoother, or more enjoyable suspension control while traversing regions of suspension control feature maps. In some cases, the suspension control feature maps may be driven by user preferences, thereby emphasizing user expectations and comfort. In some cases, the suspension control feature maps may extend proactive changes based on crowd consensus, thereby providing safer or a broader range of suspension control. In some cases, the suspension control feature maps may use terrain data to extend proactive changes to regions where samples are not available (or below a threshold), thereby still providing enhanced proactive suspension and safer operation even without sampled data or user preferences for those locations.

Thus, methods and systems of the present disclosure may be improvements to computer technology and/or vehicle suspension control technology, as disclosed herein.

Environment

Figure 1:
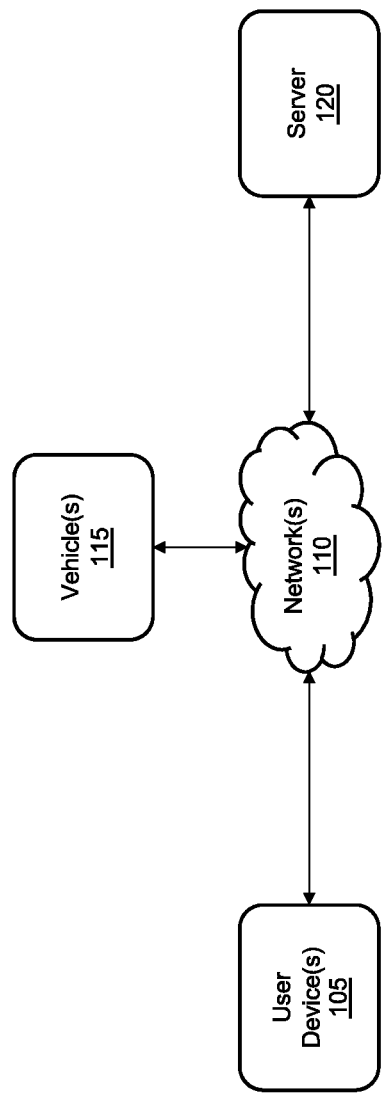
FIG. 1 depicts an example environment for dynamically adjusting one or more settings of a vehicle.

FIG. 1 shows an example environment 100 for dynamically adjusting one or more settings of a vehicle 115. The environment 100 may include one or more networks 110, one or more user devices 105, one or more vehicles 115, and a server 120, each of which may be described herein.

The user device(s) 105 may (hereinafter "user device 105" for ease of reference) may be a personal computing device, such as a cell phone, a tablet, a laptop, or a desktop computer. In some cases, the user device 105 may be an extended reality (XR) device, such as a virtual reality device, an argument reality device, a mixed reality device, and the like. In some cases, the user device 105 may be associated with a user (e.g., a driver or passenger of a vehicle). The user may have a user account associated with the user device 105 that uniquely identifies the user (e.g., within the server 120). Additional features of the user device 105 and interactions with other devices are described below.

The network(s) 110 may include one or more local networks, private networks, enterprise networks, public networks (such as the internet), cellular networks, and satellite networks, to connect the various devices in the environment 100. Generally, the various devices of the environment 100 may communicate over network(s) 110 using, e.g., network communication standards that connect endpoints corresponding to the various devices of the environment 100.

The vehicle(s) 115 ("vehicle 115" for ease of reference) may be car, truck, or off-road vehicle. In some cases, the vehicle 115 may be an autonomous vehicles, for example, whether that be fully autonomous or semi-autonomous. In some cases, the vehicle 115 may be a snowmobile, a tank, a bulldozer, a tractor, a van, a bus, a motorcycle, a scooter, a steamroller, and/or the like. The vehicle 115 may comprise a various components, such as a control system and drive system. Specific components of interest are discussed with respect to FIG. 3. In some cases, the vehicle 115 may have a variety of sensors including both internal sensors (e.g., to measure state features, such as position, velocity, speed, acceleration, etc.), feedback sensors (e.g., of actuators and adjustable components such as a suspension system), and external sensors to perceive their surroundings.

The server 120 may be a computer, a server or set of servers, a cloud system, or a combination of the foregoing. The server 120 may coordinate data and/or instructions between various devices of the environment 100. In particular, the server 120 may obtain suspension data for at least one user from a user device 105 and/or vehicles 115 associated with the user, process the suspension data, and provide suspension control feature maps to user devices 105 and/or the vehicles 115. In some cases, the server 120 may obtain suspension data from a plurality of user devices and/or vehicles (collectively, referred to as crowd-sourced geo-tagged data). In some cases the suspension data may be sampled data from sensors/system, user data regarding suspension settings, user data regarding preferences, and/or user data regarding road conditions.

In some cases, user data regarding suspension settings may be data recorded on user devices 105 and/or vehicles 115 regarding changes to suspension settings. User data regarding suspension settings may be collected by various methods, such as user inputs on a user interface of a mobile application on user device 105, logged data from vehicle components (e.g., UI 302, vehicle controller 310, or suspension controller 314), and the like.

In some cases, user data regarding preferences may be data recorded on user devices 105 and/or vehicles 115 regarding preferred settings of suspension systems for certain locations (e.g., home, racetrack, work, etc.), road types (e.g., highway or rural, etc.), or portions of roadways (e.g., for a specific segment of a road or highway). User data regarding preferences may be collected by various methods, such as user inputs on the user interface of the mobile application of user device 105, logged data from vehicle components (e.g., UI 302, vehicle controller 310, or suspension controller 314), and the like.

In some cases, user data regarding road conditions may indicate feedback regarding suspension/drive feedback, such as a type of road condition (e.g., smooth, bumpy, curvy, straight, and the like) for a segment of a road/highway. User data regarding road conditions may be collected by various methods, such as user inputs on the user interface of the mobile application of user device 105, logged data from vehicle components (e.g., UI 302, vehicle controller 310, or suspension controller 314), and the like.

In some cases, the sampled data from sensors/system may include data from internal sensors, feedback sensors, and/or external sensors. For instance, sampled data may include one or combinations of travel distance of an adjustable suspension, a rate of change of the travel distance, a derivative of the rate of change, a force sensed by a force sensor, an acceleration sensed by an accelerometer, a throttle input, a throttle input rate of change, a brake input, a brake input rate of change, a steering wheel input, or a steel wheel input rate of change.

Generally, the suspension data may be geo-tagged data. In the case of user data, the geo-tag may be applied based on where or when the user indicates the setting change, preference, or suspension/drive feedback, or may be applied based on an indicated location (e.g., using a map feature of a user interface). In the case of sampled data from sensors internal to the user device, the geo-tag may be determined by the user device (e.g., using a GPS sensor of the user device to determine a location) and applied to sampled data generated by the user device. In the case of sampled data from sensors external to the user device (e.g., from vehicle systems), the geo-tag may be determined by (1) the user device (e.g., using a GPS sensor of the user device to determine a location) and applied to sampled data received by the user device from the vehicle systems, and/or (2) the user device receives geo-tagged sampled data (e.g., the vehicle determines the location and tags the location to the sampled data).

In some cases, the user device 105 may act as a local cache (e.g., to user/vehicle environment). In some cases, the user device 105 (e.g., in the mobile application) may store sampled data and/or user data in the cache for a period of time or distance, and transmit the latest cached suspension data to the server 120. In some cases, the user device 105 (e.g., in the mobile application) may store the sampled data and/or user data in the cache until a network connectivity enables the user device 105 to transmit the data to the server 120.

Figure 2:
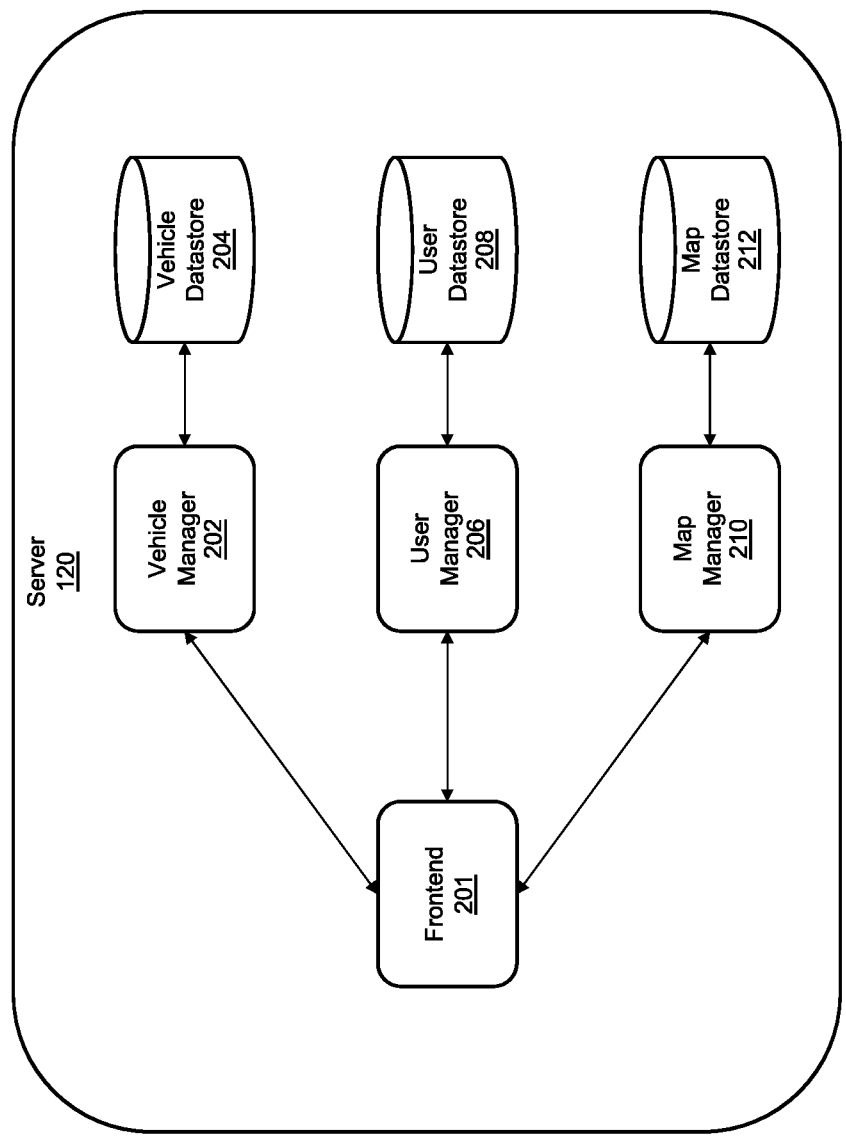
FIG. 2 depicts a block diagram of a server for dynamic control of suspension systems of vehicles.

The server 120 may manage user data (e.g., regarding accounts, vehicles, maps, suspension data), and manage received suspension data using managers and datastores shown and described with respect to FIG. 2. The datastores may store and manage relevant data for user device(s) 105, relevant data for vehicle(s) 115, relevant data for suspension systems, reference maps, and/or the like.

Server

FIG. 2 depicts a block diagram 200 of a server 120 for dynamic control of suspension systems of vehicles. Features of FIG. 2 may apply to any of FIGS. 1, 3, 4, 5, 6, 7, and 8. The server 120 may include a frontend 201, a vehicle manager 202, a vehicle datastore 204, a user manager 206, a user datastore 208, a map manager 210, and/or a map datastore 212.

The frontend 201 may perform frontend processing and inbound/outbound routing of messages. The frontend 201 may be responsible for obtaining the suspension data from a population of control devices (e.g., via an application programming interface (API)) and pre-processing it such that the data is suitable for further processing by the other features of the server 120. In some embodiments, the frontend 201 may verify that the source of the data is a user device 105 and/or vehicle 115, e.g., registered with the server 120.

The vehicle manager 202 may manage and process (1) data regarding vehicle(s) of user(s) and (2) suspension data (e.g., sampled data and/or user data). The vehicle manager 202 may process and store the data in the vehicle datastore 204, such that vehicle(s) are associated with users and suspension data is associated with users, vehicles, and/or geo-locations.

Data regarding vehicle(s) may be any information related to characteristics of vehicles. For instance, the data may include one or combinations of: vehicle type, vehicle make, vehicle model, vehicle year, vehicle milage, type of drive system, type of suspension system (e.g., magnetic suspension or pneumatic suspension), and the like.

The vehicle datastore 204 may record and/or store (1) data regarding vehicle(s) of user(s) and (2) suspension data. For instance, the vehicle datastore 204 may store the data in structured or unstructured databases, records, files, data lakes, and like.

The user manager 206 may manage and process data related to users. The user manager 206 may determine suspension data is associated with a user by an identifier (for example, using a user identifier assigned by the server 120). For instance, the user manager 206 may determine a user device 105/vehicle 115 is associated with a user and tag inbound suspension data with the identifier. In some cases, the suspension data may already include the identifier. For example, the user manager 206 may query the user datastore 208 with the identifier and determine if any matches appear. If so, the user manager 206 may process responsive data (e.g., generate a suspension control feature map), and/or update the responsive data (e.g., records associated with the identifier). Thus, in some cases, the server 120 may remain up-to-date regarding each user. Moreover, the server 120 may provide user-specific suspension control feature maps on a user-specific basis, by tracking relevant suspension data based on the identifier associated with the user.

The user datastore 208 may record and/or store the data related to users. For instance, the vehicle datastore 204 may store the data in structured or unstructured databases, records, files, data lakes, and like. In some cases, the user datastore 208 may also record/store a map preference, a control preference, drive preference, and the like for each user. For instance, the map preference may indicate whether a particular user wants to adjust his or her vehicle settings based on personal data or global data. For instance, the control preference may indicate whether the user wants his settings adjusted autonomously or wants to receive recommendations on how to adjust the suspension settings. For instance, the drive preference may indicate the manner by which a user drives (e.g., tends to drive fast).

The map manager 210 may manage and process (1) suspension control feature maps and (2) terrain maps for a plurality of locations. In some cases, the map manager 210 may generate, send, and update suspension control feature maps. In some cases, the map manager 210 may generate the suspension control feature maps based on, at least, the suspension data and user preferences (e.g., user-specific, or global). In some cases, the map manager 210 may generate the suspension control feature maps based on the suspension data and data derived from the plurality of terrain maps. In some cases, the map manager 210 may generate features of the suspension control feature map based on data derived from the plurality of terrain maps. In some cases, the map manager 210 may generate suspension control feature maps based on suspension data, user preferences, and the data derived from the plurality of terrain maps. In some cases, the map manager 210 may process and store the maps (e.g., (1) suspension control feature maps and (2) terrain maps for a plurality of locations) in the map datastore 212, such that at least the suspension control feature maps are associated with users, vehicles, and/or geo-locations.

In some cases, the map manager 210 may transmit relevant maps (e.g., suspension control feature maps) to specific user devices/vehicles, in response to user device requests (e.g., for a device/user request). In some cases, the map manager 210 may transmit the relevant maps to specific user devices/vehicles, as part of an update cycle, or at set periods of time (e.g., every day, hour, week, etc.).

In some cases, the map manager 210 may update relevant maps based on data received from users or from third party providers. For instance, the map manager 210 may update a suspension control feature map (e.g., where a user preference indicates that user preference should be set to a specific setting or feedback on a new, to the user or server 120, road) in response to a user change in a preference or feedback. For instance, the map manager 210 may update terrain maps when a third party provider provides an update to terrain, roadway feature, etc. In some cases, this update to the terrain map may cause an update to the suspension control feature map. Generally, suspension control feature maps may be stored in association with users and/or vehicles, while terrain maps may be stored separately. In some cases, where vehicles include external sensors, the map manager 210 may receive and update terrain maps based on data from the external sensors of the vehicles.

The plurality of terrain maps may include data for, each map for a given region, a set of data regarding roadways/highways. For instance, the data, may include waypoints along a highway/roadway, a 3D trajectory of a roadmap (e.g., for lanes, etc. of roadway/highway), a 3D spatial mapping of a highway/roadway (e.g., LiDAR, radar, image and/or recognition/scanning) that include 3D spatial coordinates of the operational environment around roadway/highways, and the like. Generally, terrain maps may be (or augmented to include) data indicating geo-spatial coordinates (e.g., coordinates from global positioning system for points) of roadways/highways that indicate lanes and travel directions (generally, "route data"). In some cases, the terrain maps may be (or augmented to include) vehicle heading in lanes, rate of change of heading, curves of roadway surfaces or lanes, altitude change of roadway surfaces or lanes, and the like (generally, "vehicle course data").

In some cases, the map manager 210 may generate data derived from the plurality of terrain maps. For instance, as discussed herein, the map manager 210 may determine the vehicle course data based on the route data. In some cases, the map manager 210 may analyze the route data to determine expected samples for how a vehicle may traverse a portion of roadway/highway (e.g., a rate of change in velocity or acceleration, that may be experienced by a user). For instance, an expected sample of may include: a geo-location of the expected sample, at least one statistic indicating a curvature of a route, and/or an expected suspension type for an adjustable suspension of the expected sample.

In some cases, the expected suspension type may be set based on a determination of similar suspension type for a similar curvature with a known suspension type. In some cases, the suspension type may be based on a known setting (e.g., a majority setting) from vehicles at that geo-location. In some cases, the suspension setting may be determined based on thresholds for rates of curvature at that geo-location.

In some cases, the at least one statistic indicating a curvature of a route may be vehicle heading in lanes at that geo-location, rate of change of heading at that geo-location, curves of roadway surfaces or lanes at that geo-location, and/or altitude change of roadway surfaces or lanes at that geo-location. For instance, the server 120 may determine a heading or rate of change (between two headings at two consecutive points), and the like, and use the heading or rate of change to determine whether a specific suspension setting should be used. For instance, if the heading between two points is more than a threshold, the server 120 may determine a first suspension setting; if below the threshold, a second suspension setting may be determined. Likewise, the server 120 may determine a curvature of a road above a threshold curvature may be the first suspension setting, and the curvature of the road below the threshold curvature may be the second suspension setting. Likewise, the server 120 may determine an altitude change of a road above a threshold altitude change may be the first suspension setting, and the altitude change of the road below the threshold altitude change may be the second suspension setting. In some cases, a combination of these parameters (e.g., heading in lanes at that geo-location, rate of change of heading at that geo-location, curves of roadway surfaces or lanes at that geo-location, and/or altitude change of roadway surfaces or lanes at that geo-location) may be used in a multi-variable weighted function that outputs a suspension score (e.g., between 0 and 1). If the suspension score is above threshold score, the first suspension setting may be used; if below the threshold score, the second suspension setting may be used. While examples of two suspension settings are explained, more than 2 suspension settings may be mapped to different regions of the at least one statistic. In some cases, the map manager 210 may determine the vehicle course data based on the expected samples or from suspension data.

The map datastore 212 may record and/or store (1) the suspension control feature maps, (2) the terrain maps for a plurality of locations, and (3) data associated therewith. For instance, the map datastore 212 may store the data in structured or unstructured databases, records, files, data lakes, and like.

As described herein, the server 120 may be configured to generate suspension control feature maps based on one or combinations of: suspension data (e.g., sampled data and/or user data) and expected samples (derived from terrain data). For instance, the server 120 may generate suspension control trigger conditions. A suspension control trigger condition may indicate a location or region (e.g., a portion of roadway), and a suspension setting for that location or region. The server 120 may determine the suspension control trigger conditions based on user settings to apply user preference, crowd-sourced preference, and/or combinations of both. In some cases, the server 120 may determine the suspension control trigger conditions to actively control a suspension setting, or to recommend a change in suspension setting. In some cases, the server 120 may generate the suspension control trigger conditions based on (1) settings and (2) one or more of user preferences, crowd-sourced averages, or thresholds for sets of expected samples. Thus, the server 120 may generate suspension control feature maps to define how to set a suspension setting such that a vehicle for a user performs proactively in a given region.

For instance, when a user indicates crowd-sourced control, the server 120 may determine a suspension setting be based on a consensus among users. For instance, a segment of road may be geo-tagged with a set of samples, and the server 120 may determine that the set of samples indicates a specific suspension setting should be used for a specific portion of roadway. In some cases, the suspension setting may be determined by (1) a vote mechanism (e.g., of users setting a same suspension setting) for that portion of roadway, (2) a user's preference for the portion of roadway, or (3) a determination that the portion of roadway is similar to a different portion of roadway (that has a determined setting, whether by consensus or user preference). For instance, the vote mechanism may determine a suspension setting by a percentage of user responses being greater than a threshold (e.g., 50%) that a certain suspension level was satisfactory for the portion of roadway.

As discussed herein, the suspension control feature maps may indicate locations/regions for a given suspension setting. Thus, a control device (e.g., control device 402) may enable the vehicle to maintain or transition to the suspension setting in a proactive, dynamic manner, in accordance with a user or crowd-sourced manner. Thus, the server 120 and control device 402 may provide safer, more comfortable, or enjoyable suspension settings. This may be in contrast to current protocols which may require either manual input or the vehicle driving over a particular region of road in order for the internal system to adjust the settings accordingly.

Vehicle

Figure 3:
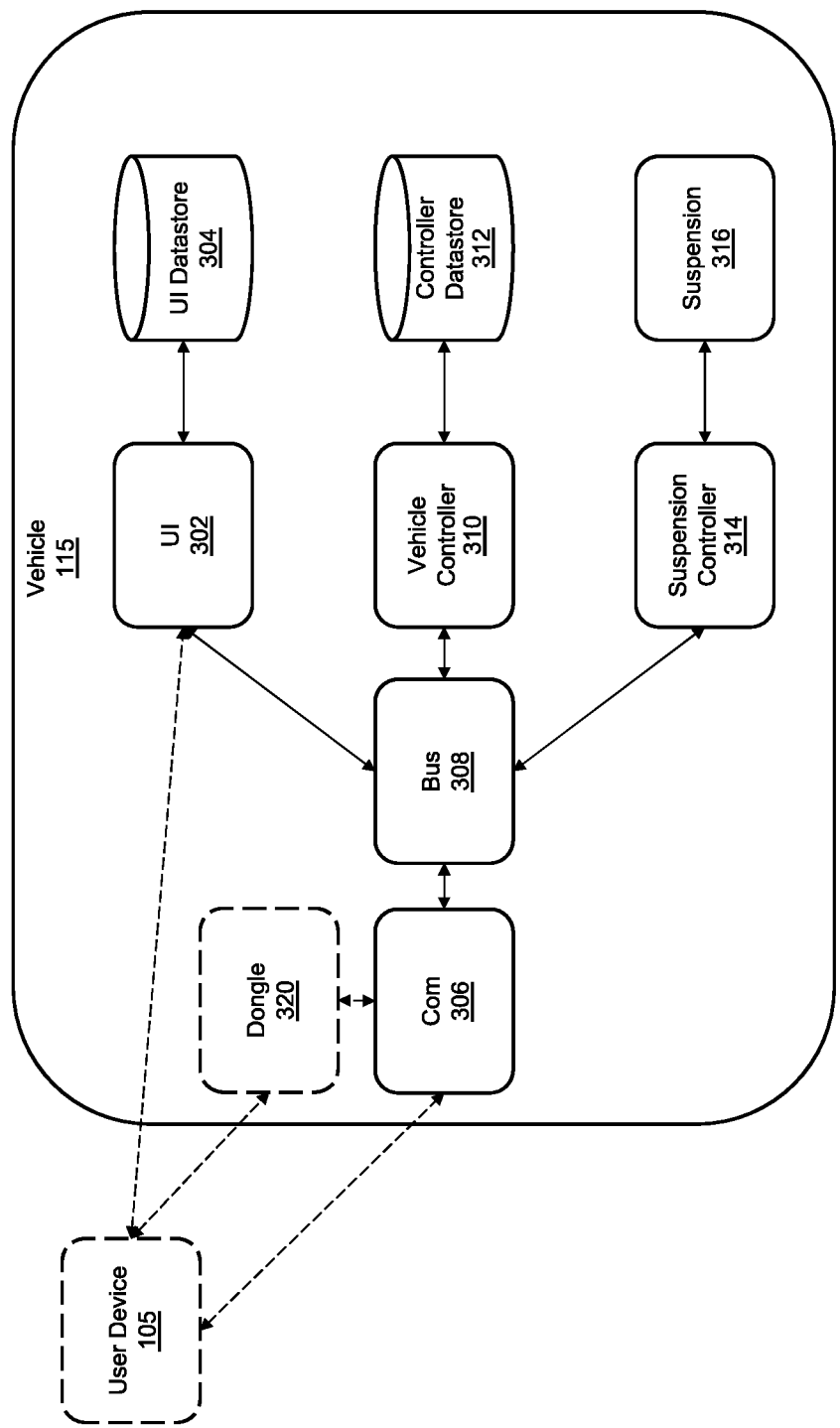
FIG. 3 depicts a block diagram of a vehicle interacting with a user device for dynamic control of a suspension system.

FIG. 3 depicts a block diagram 300 of a vehicle 115 interacting with a user device 105 for dynamic control of a suspension system. Features of FIG. 3 may apply to any of FIGS. 1, 2, 4, 5, 6, 7, and 8. The vehicle 115 may include a dongle 320 (optionally, detachable, or fixed), a communication module 306, a user interface (UI) 302, and/or the like. The vehicle 115 may also include a UI datastore 304, a bus 308, a vehicle controller 310 linked to a controller datastore 312, a suspension controller 314, and/or a suspension 316.

The dongle 320 (e.g., an on board diagnostic device, e.g., OBD 2), the communication module 306, and/or the UI 302 may communicate with the user device 105 via wired (e.g., ethernet, USB, and the like) or wireless (e.g., WIFI, Bluetooth, and the like) communication standards. In some cases, the user device 105 may cache data from the vehicle and report the data to the server 120. In some cases, the vehicle may cache the data and transmit the data to the server 120. In some cases, the user device 105 may host the suspension control feature maps, while in some cases the vehicle may host the suspension control feature maps. In some cases, the user device 105 may determine a change in suspension settings based on the suspension control feature map, and instruct the vehicle to make a change to the suspension setting. In some cases, the vehicle may determine a change in suspension settings based on the suspension control feature map, and instruct the vehicle to make a change to the suspension setting.

The UI 302 may allow a user to interface with the components of the vehicle via direct interaction and/or the user device 105. The UI 302 may provide users the ability to select options as to how to adjust the vehicle settings. For example, a user may select to adjust the settings based on personal, user-only data rather than crowd-sourced data. In such a case, the control feature map generated may be based on the user's inputs and crowd-sources geo-tagged data specific to that user. In some cases, if the user selects to adjust the settings based on crowd-sourced data, the suspension control feature map may be generated based on the crowd-sourced geo-tagged data, and used by the UI 302 (or another component of the vehicle) to determine suspension control. In some cases, the user may have an option to either have their vehicle update the suspension setting autonomously based on the determination made at the server (or by personal data collected from the user as described above) or to only be provided, via a graphical rendering of the UI display, one or recommendations on how to adjust the suspension setting based on the route at hand.

The UI datastore 304 may collect, store, and transmit information specific to any user interacting with the UI 302. For example, a user may want to flag a specific region of a control feature map with requested vehicle settings (defined as user-specific instructions). For example, a user may personally experience when driving that a particular region is bumpy and accordingly may flag the region to set the suspension to flexible and/or soft. For any subsequent trips, when the vehicle 115 enters the region, the control device 402 may override an instruction based on crowd-sourced information with this user-specific instruction. In some cases, rather than flagging particular regions with user-specific indications, a user may indicate that when his or her vehicle 115 enters a particular defined type of location, the vehicle settings be set to a certain configuration. Similar to the user-specific instruction, the control device 402 may override any crowd-source data with an instruction to set the settings according to the user's request.

The communication module 306 may be a wireless communication system (e.g., radio, WIFI, cellular, or satellite communications). The communication module 306 may transmit data to the user device 105 and/or the server 120, and receive instructions and/or data from the user device 105 and/or the server.

Generally, the dongle 320, the UI 302, and the communication module 306 may pass data, instructions, or information from the user device 105/server 120 to the bus 308, e.g., to the vehicle controller 310 and/or suspension controller 314. For instance, the bus 308 may format of the data, instruction, or information (using OBD CAN techniques) to match a format accepted by internal systems of the vehicle 115.

The bus 308 may relay the data, information, and instructions between various endpoints on the vehicle. In some cases, the bus 308 may implement both a bus controller and a bus interface designed based on one or more specifications of the vehicle 115 at hand.

The vehicle controller 310 may control different parts of the vehicle based on data input to the actuation controls of the vehicle, sensor data, and instructions from the controller datastore 312. In some cases, the controller database 312 may obtain information related to how the control device sets the suspension setting for a particular region of interest and other information related to the suspension and/or region of interest.

The suspension controller 314 may manage the suspension 316 and gather data regarding how the suspension 316 is operating. The suspension controller 314 may adjust the suspension 316 at a given time/location (for example, as the vehicle travels from an initial location to a current location) based on instructions from the control device 402 (or a determination as the control device 402). In response, the suspension controller 314 may generate machine instructions that, when executed by suspension hardware, update the suspension setting accordingly. The suspension 316 may include software and hardware components capable of executing machine instructions and dynamically adjusting the suspension setting of the vehicle. In some embodiments, additional sensors may be attached to the suspension hardware components and used to obtain and send data indicative of the state and/or other qualities of the hardware such as a deterioration condition.

The vehicle 115 may include one or more of the components described above. The vehicle 115 may include original equipment manufacturer (OEM) hardware designed for use by end-users, and/or after-market hardware/software to provide additional capabilities or software functions.

Generally, the control device 402 may be any or combinations of the communication module 306, the bus 308, the dongle 320, the vehicle controller 310, the user device 105, the suspension controller 314, and/or the UI 302.

The control device 402 may obtain a suspension control feature map and manage a suspension setting based on the suspension control feature map, location data, and a current setting of the suspension 316. In some cases, the control device 402 may output, directly or on a connected display such as the UI 302, graphical user interfaces. The graphical user interfaces may render of the suspension control feature map, feedback elements, control settings elements, and the like. For instance, the graphical user interfaces may display a geo-tagged map for presentation to a user, such that the user may be able to discern how the suspension setting will change during a route, or recommendations for changes to suspension settings. For example, a label corresponding to a suspension setting may be indicated for each region of the geo-tagged map. The control device 402 may additionally obtain and/or determine a set of suspension control trigger conditions to determine whether the current suspension setting should be adjusted and/or updated. The set of suspension control trigger conditions may be based on a current location of the vehicle 115 (e.g., the set is a subset of all suspension control trigger conditions). In some embodiments, the control device 402 may proactively determine to change the suspension settings before entering a specific location or region. When a suspension control trigger condition is satisfied, a command instruction may be sent to the suspension controller 314 indicating to update the current suspension setting.

Routine

Figure 4:
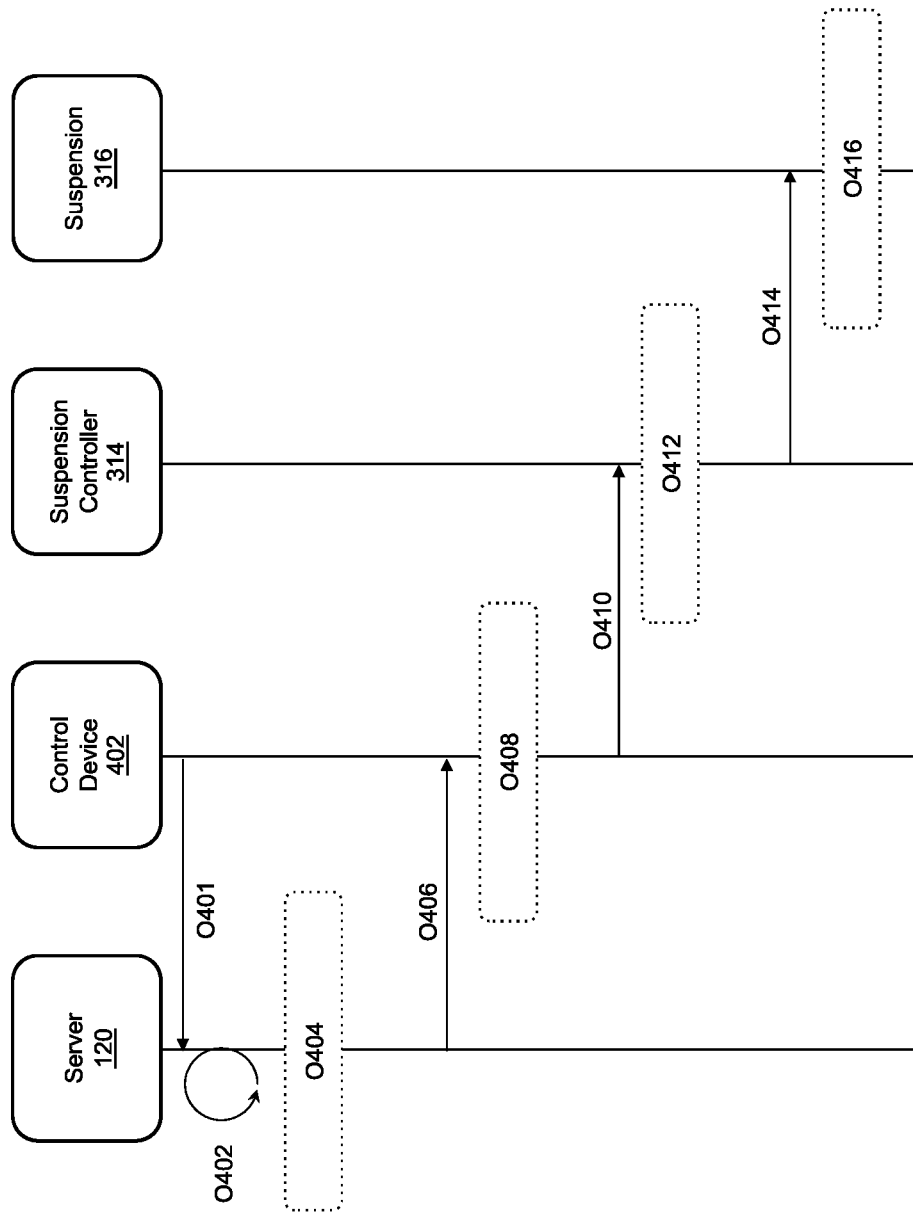
FIG. 4 depicts a flowchart of an exemplary routine for dynamic control of suspension systems of vehicles.

FIG. 4 depicts a flowchart of an exemplary routine 400 for control of adjustable settings in a vehicle. Features of FIG. 4 may apply to any of FIGS. 1, 2, 3, 5, 6, 7, and 8.

In the routine 400, the method may be performed by one or more systems, such as the systems described with respect to FIGS. 1-3. The routine 400 may start at operation O401, where the control device 402 may save and report data related to a user's vehicle 115, as discussed herein.

At operation O402, the server 120 may receive the suspension data from the control device 402. Additionally, the server 120 may obtain and aggregate suspension data received from a plurality of control devices 402 associated with a population of users, as discussed herein.

At operation O404, the server 120 may generate a suspension control feature map for a user/vehicle of a user. For instance, based on user settings, the server 120 may generate a user-specific suspension control feature map based on suspension data, and/or data derived from terrain maps, as discussed herein.

At operation O406, the server 120 may transmit the suspension control feature map to control device 402. The control device 402 may receive the suspension control feature map. In some cases, the control device 402 may merge the feature map to a local user map.

At operation O408, the control device 402 may use the suspension control feature map to determine suspension settings for the vehicle. For instance, the control device 402 may assess whether one or more suspension triggering conditions have been satisfied and, if so, whether to adjust a setting of the vehicle based on the vehicle's location.

At operation O410, when a determination is made to change the suspension setting, the control device 402 may transmit a command instruction to the suspension controller 314 indicating how to adjust the setting. In cases where the control device 402 is the suspension controller 314, the suspension controller 314 may determine to send an instruction to the suspension.

At operation O412, the suspension controller 314 may translate the command instruction to machine instructions for the suspension to execute. At operation O414, the suspension controller 314 may transmit the machine instructions to the suspension 316. The suspension 316 may receive the machine instructions. At operation O416, the suspension 316 may adjust the suspension setting in accordance with the machine instructions.

In some cases, the server 120 may be configured to obtain suspension data for at least one user and generate a suspension control feature map for a first user based on at least the suspension data. In some cases, the at least one user includes the first user.

In some cases, the control device 402 may be configured to obtain the suspension control feature map from the server 120 for the first user. Generally, the control device 402 may be associated with the first user and configured to control an adjustable suspension of a vehicle associated with the first user.

In some cases, to control the adjustable suspension of the vehicle, the control device 402 may be configured to: determine an initial location of the vehicle; determine a region of the suspension control feature map that corresponds to the initial location of the vehicle; determine a set of suspension control trigger conditions based on the region of the suspension control feature map; determine a current location of the vehicle; determine whether a first suspension control trigger condition of the set of suspension control trigger conditions is satisfied based on the current location; and in response to determining the first suspension control trigger condition is satisfied, instruct the adjustable suspension of the vehicle to transition from a first adjustable suspension setting to a second adjustable suspension setting. In some cases, the control device 402 may skip determining an initial location and proceed directly to determining a current location (thereby using a predefine set of all suspension control trigger conditions).

In some cases, to obtain the suspension data for the at least one user, the server 120 may be configured to: obtain crowd-sourced geo-tagged data from a plurality of vehicles and/or a plurality of user devices. In some cases, the crowd-sourced geo-tagged data includes, for each sample of a set of samples, a geo-location of the sample, a suspension type for an adjustable suspension of the sample, a current suspension setting of the sample, and at least one statistic. For instance, the server 120 may use the suspension type and current suspension setting to determine consensus of crowd-sourced data for overlapping regions of samples.

In some cases, the at least one statistic includes one or combinations of: a travel distance of the adjustable suspension, a rate of change of the travel distance, a derivative of the rate of change, a force sensed by a force sensor, an acceleration sensed by an accelerometer, a throttle input, a throttle input rate of change, a brake input, a brake input rate of change, a steering wheel input, or a steel wheel input rate of change. For instance, the server 120 may use the at least one statistic to determine a type of suspension that could be applied to a given experience. For instance, one or more thresholds for different types of statistics may indicate a better or worse suspension setting for a given range of a statistic. As an example, if a threshold number of vehicles experience a travel distance (in a same location or region) in excess of a threshold travel distance, the server 120 may determine that a specific suspension setting should be applied for that location or region. Thus, the crowd-sourced geo-tagged data may form a consensus based on sensor data, without specific user feedback. In some cases, the statistics may be correlated to user suspension settings and/or feedback regarding the location or region, thus forming a consensus by similar experience for locations or regions that exhibit similar statistics (e.g., within a threshold similarity score). In some cases, each sample is obtained by respective control devices 402 associated with a particular vehicle, cached, and transmitted to the server.

In some cases, to generate the suspension control feature map for the first user based on at least the suspension data, the server 120 may be configured to: generate the suspension control feature map based on the suspension data and data derived from terrain data of maps associated with routes. In some cases, the data derived from terrain data of maps includes a plurality of expected samples based on the terrain data. In some cases, each expected sample of a set of expected samples may include: a geo-location of the expected sample, at least one statistic indicating a curvature of a route, and/or an expected suspension type for an adjustable suspension of the expected sample.

For instance, the server 120 may generate the suspension control feature map by first populating a map with crowd-sourced geo-tagged suspension trigger conditions based on crowd-sourced geo-tagged suspension data. For instance, the suspension control feature map may determine the crowd-sourced geo-tagged suspension trigger conditions based on crowd consensus of suspension settings or user feedback regarding locations. For instance, each crowd-sourced geo-tagged suspension trigger condition may include a location and a suspension setting that corresponds to a most common suspension setting across all users and/or reported data.

Next, the server 120 may populate the map with user-defined suspension trigger conditions based on user preferences or feedback for the first user. For instance, the user-defined suspension trigger conditions may include a location and a suspension setting that the first user set themselves for a location or the first user indicated as user feedback indicating that the location should have a different setting (e.g., from what the user had used in that moment). In some cases, the server 120 may populate the crowd-sourced geo-tagged suspension trigger conditions with the user-defined suspension trigger conditions, even if they are for a same location or for locations within a threshold distance. The control device 402 may determine which ones to use at run time (e.g., based on user settings). In some cases, the server 120 may overwrite the crowd-sourced geo-tagged suspension trigger conditions with the user-defined suspension trigger conditions if they are for a same location or for locations within a threshold distance (e.g., based on user settings).

Next, the server 120 may populate the map with terrain-data suspension trigger conditions based on expected samples. For instance, the terrain-data suspension trigger conditions may include a location and a suspension setting that the expected samples indicate as a most likely suspension setting. For instance, the server 120 may determine default suspension settings based on the various thresholds or functions discussed above. In some cases, the server 120 may perform a similarity analysis between expected samples and the crowd-sourced geo-tagged suspension trigger conditions (and/or the user-defined suspension trigger conditions, based on user settings). In this case, the server 120 may determine if the default settings are for locations that have a similar curvature features as locations where the server 120 has known data (e.g., from crowd source or user source). In the case that the default settings match known data, the server 120 may proceed to the default settings; otherwise, the server 120 may change the suspension setting based on suspension setting for the known locations.

In some cases, the server 120 may populate the crowd-sourced geo-tagged suspension trigger conditions, the user-defined suspension trigger conditions, and the terrain-data suspension trigger conditions, even if they are for a same location or for locations within a threshold distance. The control device 402 may determine which ones to use at run time (e.g., based on user settings). In some cases, the server 120 may overwrite the crowd-sourced geo-tagged suspension trigger conditions and/or the terrain-data suspension trigger conditions with the user-defined suspension trigger conditions if they are for a same location or for locations within a threshold distance (e.g., based on user settings).

In some cases, to obtain the suspension data for the at least one user, the server 120 may be configured to: collect user inputs indicating: (1) user changes in adjustable suspension settings, (2) user feedback, via a graphical user interface, on an experience on a portion of a route, and/or (3) user preference, via the graphical user interface, of an adjustable suspension setting for the portion of the route or near a defined location or address. Thus, user data may inform specific proactive suspension setting by providing data regarding specific locations, thereby improving the suspension control feature map for that user.

In some cases, to generate the suspension control feature map for the first user, the server 120 may be configured to: obtain a user selection for a type of map; and generate the suspension control feature map based on the user selection. For instance, in response to the user selecting a user-only data option for the suspension control feature map, the server 120 may be configured to: generate the suspension control feature map based on user inputs specific to that user and crowd-sourced geo-tagged data specific to that user. In this case, the suspension control feature map may be under populated (vs a crowd-sourced or terrain-data based map), but highly tailored to that specific user, thereby improving the suspension control feature map for that user.

For instance, in response to the user selecting crowd-sourced data option for the suspension control feature map, the server 120 may be configured to: generate the suspension control feature map based on crowd-sourced geo-tagged data and a consensus of user inputs of all users. In this case, the suspension control feature map may be highly populated (vs a user-only feature map), but not narrowly tailored to that specific user, thereby improving the proactive suspension control for that user.

In some cases, for defined types of locations or user-specific indications, the server 120 may be configured to: override the crowd-sourced geo-tagged data with a user-specific instruction. In these cases, the suspension control feature map be both highly tailored to that specific user and also highly populated (e.g., with crowd-sourced consensus and/or terrain-data triggers) thereby improving the suspension control feature map for that user and improving the proactive suspension control for that user.

In some cases, the suspension control feature map may indicate, for each region of a set of regions on routes of a map, a label corresponding to a specific adjustable suspension setting. Each region of the set of regions may be labeled with the specific adjustable suspension setting in accordance with a labeling condition. For instance, the labeling condition may be set by the set of suspension control trigger conditions, and each region may be based on the locations of the suspension control trigger conditions. See, e.g., FIG. 7.

In some cases, each label is associated with at least one suspension control trigger condition. For instance, a label may have a crowd-sourced geo-tagged suspension control trigger condition, a user-defined suspension control trigger condition, and/or a terrain-data suspension control trigger condition. The control device 402 may determine which one to apply at run time based on user settings.

In some cases, the suspension control trigger condition may include a logical operator that determines whether the current location is within a threshold distance to a geo-fence of the region. For instance, the logical operator may return true when a current location is within a geo-fence of the region, within a threshold period of time of travel, or within the threshold distance.

In some cases, the suspension control trigger condition may include a logical operator that determines whether the current adjustable suspension setting does not match the specific adjustable suspension setting of the label. For instance, the logical operator may compare a current suspension setting to the labeled setting and, if they do not match, determine a suspension setting change; if they do match, determine no suspension setting change is needed.

Graphical User Interface

Figure 5:
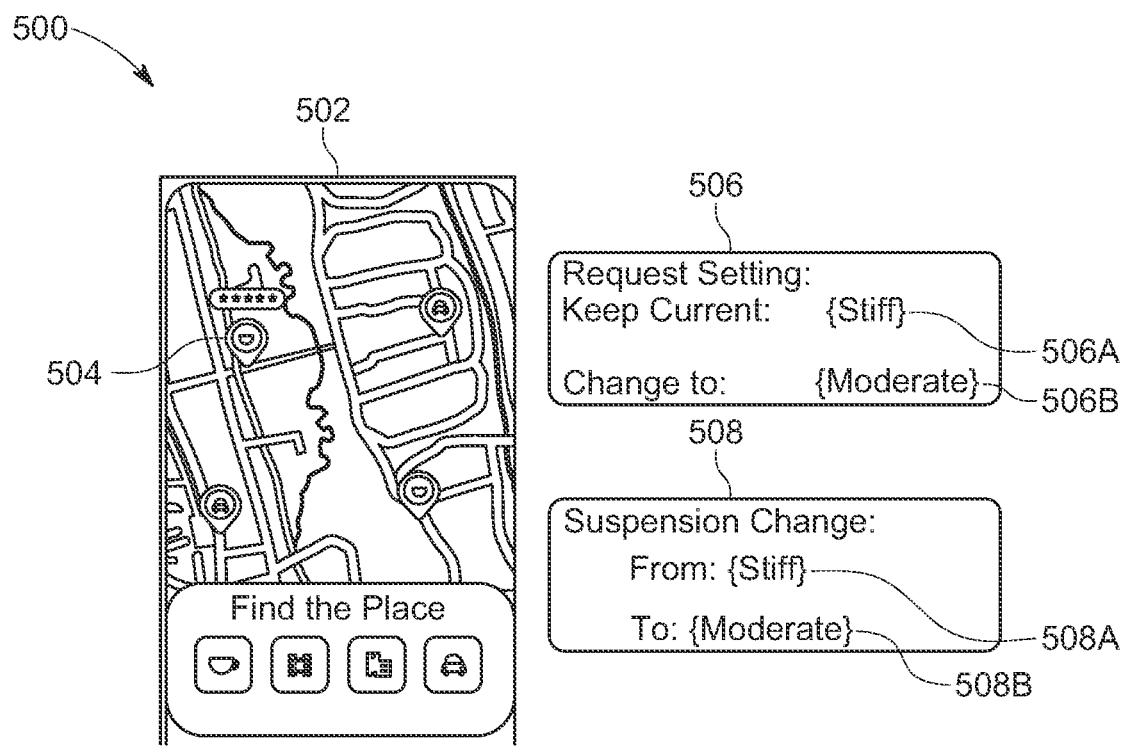
FIG. 5 depicts an exemplary graphical user interface and a process to determine suspension control trigger conditions based on user inputs, or indicating changes to a user.

FIG. 5 depicts an exemplary graphical user interface 500 and a process to determine suspension control trigger conditions based on user inputs, or indicating changes to a user. Features of FIG. 5 may apply to any of FIGS. 1, 2, 3, 4, 6, 7, and 8.

The graphical user interface 500 may be displayed on a user device 105 or control device 402, as discussed herein. The graphical user interface 500 may include a map 502. The map 502 may include features such as roads, locations, geographic features, and the like. In some cases, the map may display an indicator 504. The indicator 504 may be located on a geographic location within the map 502. In some cases, the indicator 504 may be an indicator of an upcoming suspension control change (e.g., as proactively determined by the control device 402). In some cases, the indicator 504 may be displayed in response to a user input on the map at that location.

In response to a user input on the indicator 504, the graphical user interface 500 may be updated to display a user setting change element 506. The user setting change element 506 may indicate a current setting 506A and at least one option 506B to change a suspension setting. The user may make a user selection (e.g., by an input) selecting the current setting 506A or the at least one option 506B. In response to the user selecting the current setting 506A, the control device 402 may log a user preference of keeping a current setting for this location. In response to the user selecting the at least one option 506B, the control device 402 may log a user preference of changing a suspension setting and/or change a current suspension setting of vehicle.

In response to a user input on the map 502 (or in response to recommendation to change settings, e.g., from terrain data, the graphical user interface 500 may be updated to display a suspension change element 508. The suspension change element 508 may display an upcoming change in suspension setting or a recommended suspension setting 508B (e.g., that will only become active is selected), in contrast to a current suspension setting 508A. In response to the user selecting the recommended suspension setting 508B or negating (e.g., by clicking away) an upcoming change in suspension setting, the control device 402 may log a user preference of changing a current setting for this location and/or change a current suspension setting of vehicle. In some cases, by interacting with the element within a period of time, the control device 402 may interpret the user input as declining the change. In some cases, by not interacting with the element within a period of time, the control device 402 may interpret the user input as accepting the change. In response to selecting the current suspension setting 508A, the control device 402 may log a user preference of keeping a suspension setting.

Thus, the graphical user interface 500 may be examples of collecting user inputs indicating one or more of the following: user changes in adjustable suspension settings, user feedback on an experience on a portion of a route, and/or user preference of an adjustable suspension setting for the portion of the route or near a defined location or address. The data may be stored on a local cache of control device 402/user device 105 and transmitted to the server 120. In some cases, the server 120 to adjust the suspension control feature map in accordance with the user's personal preferences rather than global preferences, based on this user interactions. In some cases, the control device 402 may update the suspension control feature map directly based on these user interactions, and the control device 402 may report changes/updates over time.

Determining Suspension Control Trigger Conditions Based on Data

Figure 6:
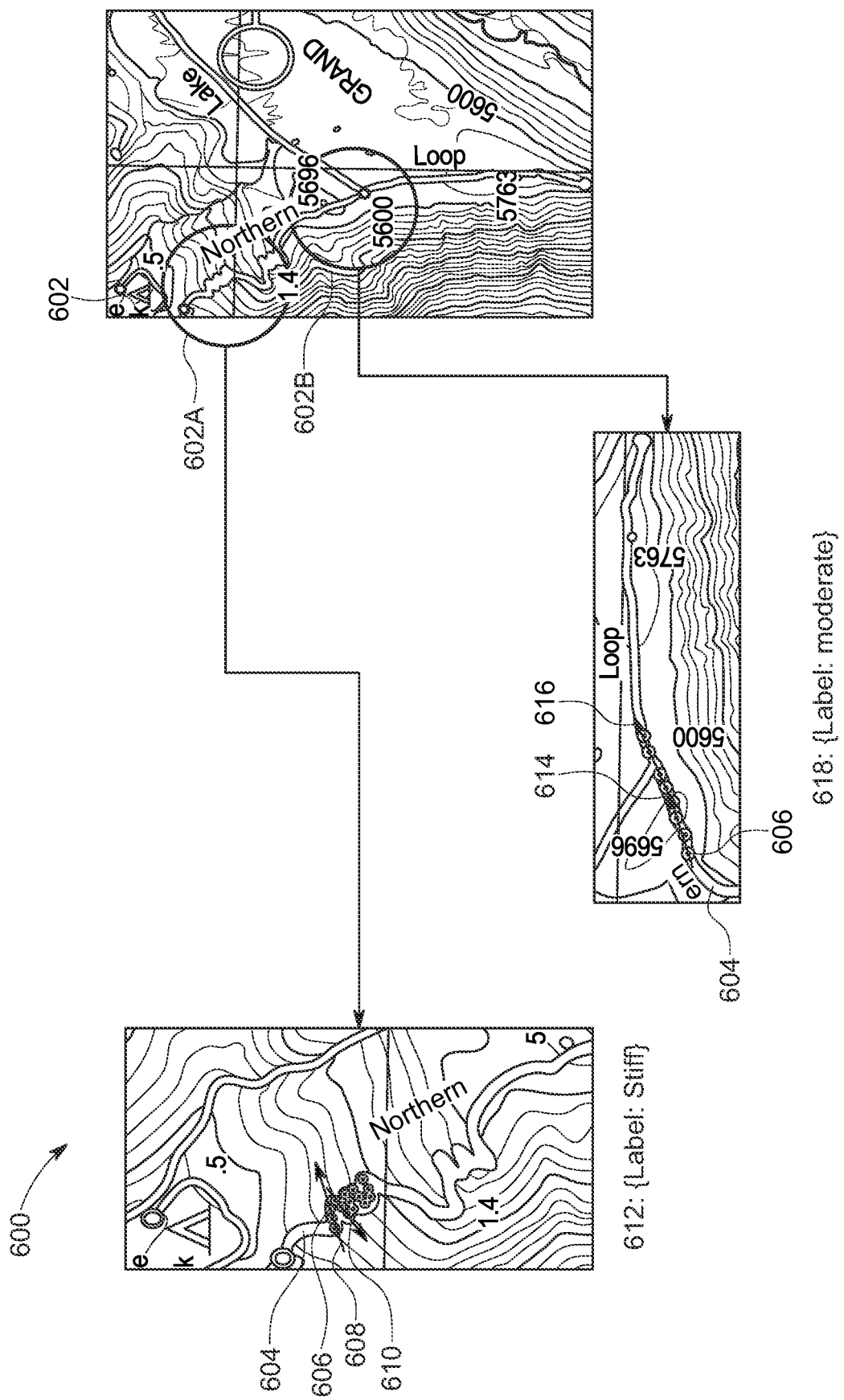
FIG. 6 depicts an exemplary process of determining suspension control trigger conditions based on data.

FIG. 6 depicts a process 600 of determining suspension control trigger conditions based on data. Features of FIG. 6 may apply to any of FIGS. 1, 2, 3, 4, 5, 7, and 8.

As shown in FIG. 6, the process 600 may operate on data of a map 602. The map 602 may include a plurality of regions, including first region 602A and second region 602B associated with a roadway 604. While the map 602 and the first region 602A and the second region 602B are displayed graphically, the data and processing steps may be performed without graphically displaying data points, data derived from the maps, and the like. In the first region 602A and the second region 602B, samples 606 (e.g., sampled data from sensors or expected samples from terrain data) may be located on portions of the first region 602A and the second region 602B. While the samples 606 are depicted relatively close together, the samples 606 may be geo-located based on where sampled data was geo-tagged or, for expected samples, based on terrain data.

The server 120 may analyze samples 606 to determine various features 608, 610, 614, and 616, as discussed herein, to determine labels 612 and 618 for regions 602A and 602B. In some cases, the samples 606 may be sampled data, and the features 608, 610, 614, and 616 may be changes of statistics regarding systems and/or user data, and the features 608, 610, 614, and 616 may be used to determine labels 612 and 618 for regions 602A and 602B. In some cases, the samples 606 may be expected samples, and the features 608, 610, 614, and 616 may be changes of at least one statistic indicating a curvature of a route, and the features 608, 610, 614, and 616 may be used to determine labels 612 and 618 for regions 602A and 602B.

As an example, feature 608 may be a first heading (or rate of change of heading) on a first sub-portion of the region 602A, and feature 610 may be a second heading (or rate of change of heading) on a second sub-portion of the region 602A. Because the first heading is more than a threshold heading away from the second heading, the server 120 may determine the label 612 as a first suspension setting (e.g., stiff). Likewise, feature 614 may be a first heading (or rate of change of heading) on a first sub-portion of the region 602B, and feature 616 may be a second heading (or rate of change of heading) on a second sub-portion of the region 602B. Because the first heading is not more than a threshold heading away from the second heading, the server 120 may determine the label 612 as a second suspension setting (e.g., moderate).

Control Device

Figure 7:
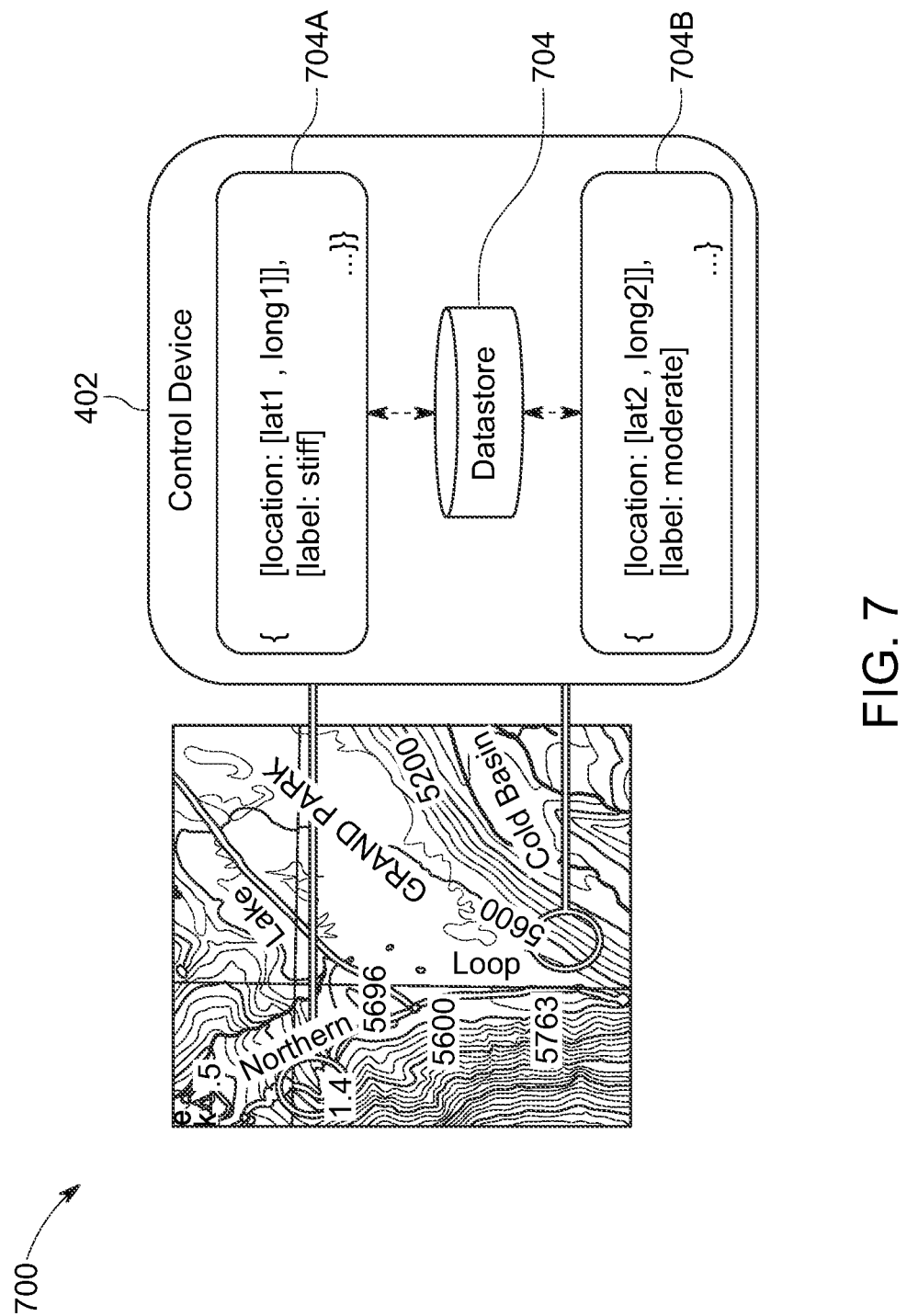
FIG. 7 depicts an exemplary overview of a system configured to adjust one or more vehicle settings based on terrain data.

FIG. 7 depicts an exemplary overview of a system 700 configured to control suspension settings. Features of FIG. 7 may apply to any of FIGS. 1, 2, 3, 4, 5, 6, and 8.

As shown, the system 700 may include a control device 402 and a datastore 704 storing suspension control trigger conditions, including first suspension control trigger condition 704A and second suspension control trigger condition 704B. The control device 402 may determine relevant suspension control trigger condition based on an initial location of a vehicle (e.g., within map 602). As the vehicle approaches either of first suspension control trigger condition 704A and second suspension control trigger condition 704B, the control device 402 may determine (based on a logical operator for the trigger conditions) whether the vehicle is within a threshold time, distance, etc. of the first suspension control trigger condition 704A and second suspension control trigger condition 704B. If so, the control device 402 may determine whether a logical operator of either of first suspension control trigger condition 704A and second suspension control trigger condition 704B are satisfied (e.g., a suspension setting matches a label for the region). If so, the control device 402 may maintain the suspension setting; if not, the control device 402 may determine to change the suspension setting before or at a threshold distance, time, etc. of the region for the trigger condition. Thus, the control device 402 may proactively adjust the suspension setting to provide the user a better experience and/or increase safety.

Computer System

Figure 8:
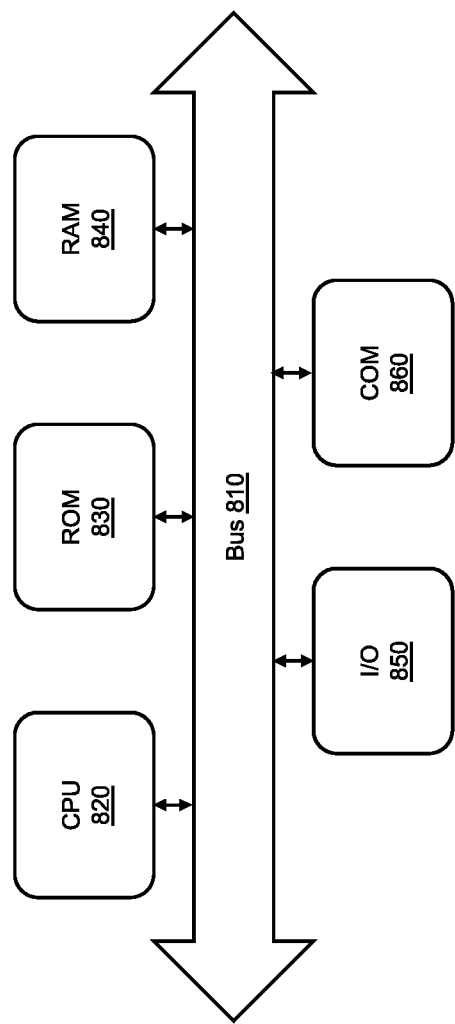
FIG. 8 depicts an example system that may execute techniques presented herein.

FIG. 8 depicts an example system that may execute techniques presented herein. FIG. 8 is a simplified functional block diagram of a computer that may be configured to execute techniques described herein, according to exemplary cases of the present disclosure. Specifically, the computer (or "platform" as it may not be a single physical computer infrastructure) may include a data communication interface 860 for packet data communication. The platform may also include a central processing unit 820 ("CPU 820"), in the form of one or more processors, for executing program instructions. The platform may include an internal communication bus 810, and the platform may also include a program storage and/or a data storage for various data files to be processed and/or communicated by the platform such as ROM 830 and RAM 840, although the system 800 may receive programming and data via network communications. The system 800 also may include input and output ports 850 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical, and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of +10% in a stated value.

The term "exemplary" is used in the sense of "example" rather than "ideal." As used herein, the singular forms "a," "an," and "the" include plural reference unless the context dictates otherwise.

Examples

Exemplary embodiments of the systems and methods disclosed herein are described in the numbered paragraphs below.

A1. A system for control of an adjustable suspension in a vehicle, the system comprising:
- a server configured to obtain suspension data for at least one user and generate a suspension control feature map for a first user based on at least the suspension data, wherein the at least one user includes the first user; and
- a control device configured to obtain the suspension control feature map from the server, wherein the control device is associated with the first user and configured to control an adjustable suspension of a vehicle associated with the first user,
- wherein, to control the adjustable suspension of a vehicle, the control device is configured to:
  - determine an initial location of the vehicle;
  - determine a region of the suspension control feature map that corresponds to the initial location of the vehicle;
  - determine a set of suspension control trigger conditions based on the region of the suspension control feature map;
  - determine a current location of the vehicle;
  - determine whether a first suspension control trigger condition of the set of suspension control trigger conditions is satisfied based on the current location; and
  - in response to determining the first suspension control trigger condition is satisfied, instruct the adjustable suspension of the vehicle to transition from a first adjustable suspension setting to a second adjustable suspension setting.

A2. The system of A1, wherein, to obtain the suspension data for the at least one user, the system is configured to: obtain crowd-sourced geo-tagged data from a plurality of vehicles and/or a plurality of user devices.

A3. The system of A2, wherein the crowd-sourced geo-tagged data includes, for each sample of a set of samples, a geo-location of the sample, a suspension type for an adjustable suspension of the sample, a current suspension setting of the sample, and at least one statistic.

A4. The system of A3, wherein the at least one statistic includes a travel distance of the adjustable suspension, a rate of change of the travel distance, a derivative of the rate of change, a force sensed by a force sensor, an acceleration sensed by an accelerometer, a throttle input, a throttle input rate of change, a brake input, a brake input rate of change, a steering wheel input, or a steel wheel input rate of change.

A5. The system of A3, wherein each sample is obtained by a control device associated with a particular vehicle, cached, and transmitted to the server.

A6. The system of any of A1-A5, wherein, to generate the suspension control feature map for the first user based on at least the suspension data, the system is configured to: generate the suspension control feature map based on the suspension data and data derived from terrain data of maps associated with routes, wherein the data derived from terrain data of maps includes a plurality of expected samples based on the terrain data.

A7. The system of A6, wherein each expected sample of a set of expected samples includes: a geo-location of the expected sample, at least one statistic indicating a curvature of a route, and an expected suspension type for an adjustable suspension of the expected sample.

A8. The system of any of A1-A7, wherein, to obtain the suspension data for the at least one user, the system is configured to: collect user inputs indicating: (1) user changes in adjustable suspension settings, (2) user feedback, via a graphical user interface, on an experience on a portion of a route, and/or (3) user preference, via the graphical user interface, of an adjustable suspension setting for the portion of the route or near a defined location or address.

A9. The system of any of A1-A8, wherein, to generate the suspension control feature map for the first user, the system is configured to: obtain a user selection for a type of map; and generate the suspension control feature map based on the user selection.

A10. The system of A9, wherein, in response to the first user selecting a user-only data option for the suspension control feature map, the system is configured to: generate the suspension control feature map based on user inputs specific to that user and crowd-sourced geo-tagged data specific to that user.

A11. The system of A9, wherein, in response to the first user selecting crowd-sourced data option for the suspension control feature map, the system is configured to: generate the suspension control feature map based on crowd-sourced geo-tagged data and a consensus of user inputs of all users.

A12. The system of A11, wherein, for defined types of locations or user-specific indications, the system is configured to: override the crowd-sourced geo-tagged data with a user-specific instruction.

A13. The system of A9, wherein the suspension control feature map indicates, for each region of a set of regions on routes of a map, a label corresponding to a specific adjustable suspension setting, and each region is labeled with the specific adjustable suspension setting in accordance with a labeling condition.

A14. The system of A13, wherein each label is associated with a suspension control trigger condition.

A15. The system of A14, wherein the suspension control trigger condition includes a logical operator that determines whether the current location is within a threshold distance to a geo-fence of the region.

A16. The system of A14, wherein the suspension control trigger condition includes a logical operator that determines whether the current adjustable suspension setting does not match the specific adjustable suspension setting of the label.

A17. A computer-implemented method for control of an adjustable suspension in a vehicle, the computer-implemented method comprising:
- obtaining a suspension control feature map;
- determining an initial location of a vehicle;

determining a region of the suspension control feature map that corresponds to the initial location of the vehicle;
determining a set of suspension control trigger conditions based on the region of the suspension control feature map;
determining a current location of the vehicle;
determining whether a first suspension control trigger condition of the set of suspension control trigger conditions is satisfied based on the current location; and
in response to determining the first suspension control trigger condition is satisfied, instructing an adjustable suspension of the vehicle to transition from a first adjustable suspension setting to a second adjustable suspension setting.

A18. The computer-implemented method of A17, further comprising: generating the suspension control feature map based on user inputs specific to that user and crowd-sourced geo-tagged data specific to that user.

A19. The computer-implemented method of A17, further comprising: generating the suspension control feature map based on crowd-sourced geo-tagged data and a consensus of user inputs of all users.

A20. A non-transitory computer-readable memory comprising instructions thereon that, when executed by at least one processor, cause the at least one processor to perform a method, the method comprising:
obtaining a suspension control feature map;
determining an initial location of a vehicle;
determining a region of the suspension control feature map that corresponds to the initial location of the vehicle;
determining a set of suspension control trigger conditions based on the region of the suspension control feature map;
determining a current location of the vehicle;
determining whether a first suspension control trigger condition of the set of suspension control trigger conditions is satisfied based on the current location; and
in response to determining the first suspension control trigger condition is satisfied, instructing an adjustable suspension of the vehicle to transition from a first adjustable suspension setting to a second adjustable suspension setting.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for control of an adjustable suspension in a vehicle, the system comprising:
a server configured to obtain suspension data for at least one user and generate a suspension control feature map for a first user based on at least the suspension data, wherein the at least one user includes the first user; and
a control device configured to obtain the suspension control feature map from the server, wherein the control device is associated with the first user and configured to control an adjustable suspension of a vehicle associated with the first user,
wherein, to control the adjustable suspension of a vehicle, the control device is configured to:
determine an initial location of the vehicle;
determine a region of the suspension control feature map that corresponds to the initial location of the vehicle;
determine a set of suspension control trigger conditions based on the region of the suspension control feature map;
determine a current location of the vehicle;
determine whether a first suspension control trigger condition of the set of suspension control trigger conditions is satisfied based on the current location; and
in response to determining the first suspension control trigger condition is satisfied, instruct the adjustable suspension of the vehicle to transition from a first adjustable suspension setting to a second adjustable suspension setting,
wherein, to generate the suspension control feature map for the first user, the system is configured to:
obtain a user selection for a type of map; and
generate the suspension control feature map based on the user selection.

2. The system of claim 1, wherein, to obtain the suspension data for the at least one user, the system is configured to: obtain crowd-sourced geo-tagged data from a plurality of vehicles and/or a plurality of user devices.

3. The system of claim 2, wherein the crowd-sourced geo-tagged data includes, for each sample of a set of samples, a geo-location of the sample, a suspension type for an adjustable suspension of the sample, a current suspension setting of the sample, and at least one statistic.

4. The system of claim 3, wherein the at least one statistic includes a travel distance of the adjustable suspension, a rate of change of the travel distance, a derivative of the rate of change, a force sensed by a force sensor, an acceleration sensed by an accelerometer, a throttle input, a throttle input rate of change, a brake input, a brake input rate of change, a steering wheel input, or a steering wheel input rate of change.

5. The system of claim 3, wherein each sample is obtained by a control device associated with a particular vehicle, cached, and transmitted to the server.

6. The system of claim 1, wherein, to generate the suspension control feature map for the first user based on at least the suspension data, the system is configured to: generate the suspension control feature map based on the suspension data and data derived from terrain data of maps associated with routes, wherein the data derived from terrain data of maps includes a plurality of expected samples based on the terrain data.

7. The system of claim 6, wherein each expected sample of a set of expected samples includes: a geo-location of the expected sample, at least one statistic indicating a curvature of a route, and an expected suspension type for an adjustable suspension of the expected sample.

8. The system of claim 1, wherein, to obtain the suspension data for the at least one user, the system is configured to: collect user inputs indicating: (1) user changes in adjustable suspension settings, (2) user feedback, via a graphical user interface, on an experience on a portion of a route, and/or (3) user preference, via the graphical user interface, of an adjustable suspension setting for the portion of the route or near a defined location or address.

9. The system claim 1, wherein, in response to the first user selecting a user-only data option for the suspension control feature map, the system is configured to: generate the suspension control feature map based on user inputs specific to that user and crowd-sourced geo-tagged data specific to that user.

10. The system of claim 1, wherein, in response to the first user selecting crowd-sourced data option for the suspension control feature map, the system is configured to: generate the suspension control feature map based on crowd-sourced geo-tagged data and a consensus of user inputs of all users.

11. The system of claim 10, wherein, for defined types of locations or user-specific indications, the system is configured to: override the crowd-sourced geo-tagged data with a user-specific instruction.

12. The system of claim 1, wherein the suspension control feature map indicates, for each region of a set of regions on routes of a map, a label corresponding to a specific adjustable suspension setting, and each region is labeled with the specific adjustable suspension setting in accordance with a labeling condition.

13. The system of claim 12, wherein each label is associated with a suspension control trigger condition.

14. The system of claim 13, wherein the suspension control trigger condition includes a logical operator that determines whether the current location is within a threshold distance to a geo-fence of the region.

15. The system of claim 13, wherein the suspension control trigger condition includes a logical operator that determines whether the current adjustable suspension setting does not match the specific adjustable suspension setting of the label.

16. A computer-implemented method for control of an adjustable suspension in a vehicle, the computer-implemented method comprising:
  obtaining a suspension control feature map;
  determining an initial location of a vehicle;
  determining a region of the suspension control feature map that corresponds to the initial location of the vehicle;
  determining a set of suspension control trigger conditions based on the region of the suspension control feature map;
  determining a current location of the vehicle;
  determining whether a first suspension control trigger condition of the set of suspension control trigger conditions is satisfied based on the current location; and
  in response to determining the first suspension control trigger condition is satisfied, instructing an adjustable suspension of the vehicle to transition from a first adjustable suspension setting to a second adjustable suspension setting,
  wherein the suspension control feature map is generated based on:
  obtaining a user selection for a type of map; and
  generating the suspension control feature map based on the user selection.

17. The computer-implemented method of claim 16, wherein generating the suspension control feature map based on the user selection includes: generating the suspension control feature map based on user inputs specific to that user and crowd-sourced geo-tagged data specific to that user.

18. The computer-implemented method of claim 16, further comprising: generating the suspension control feature map based on the crowd-sourced geo-tagged data and a consensus of user inputs of all users.

19. A non-transitory computer-readable memory comprising instructions thereon that, when executed by at least one processor, cause the at least one processor to perform a method, the method comprising:
  obtaining a suspension control feature map;
  determining an initial location of a vehicle;
  determining a region of the suspension control feature map that corresponds to the initial location of the vehicle;
  determining a set of suspension control trigger conditions based on the region of the suspension control feature map;
  determining a current location of the vehicle;
  determining whether a first suspension control trigger condition of the set of suspension control trigger conditions is satisfied based on the current location; and
  in response to determining the first suspension control trigger condition is satisfied, instructing an adjustable suspension of the vehicle to transition from a first adjustable suspension setting to a second adjustable suspension setting,
  wherein the suspension control feature map is generated based on:
  obtaining a user selection for a type of map; and
  generating the suspension control feature map based on the user selection.

* * * * *